Sept. 30, 1930. F. E. MUHRBECK 1,777,126
QUACK GRASS DESTROYER
Filed July 30, 1927 2 Sheets-Sheet 2

Inventor
Fritz Einar Muhrbeck
By his Attorneys
Williamson Reif
& Williamson

Patented Sept. 30, 1930

1,777,126

UNITED STATES PATENT OFFICE

FRITZ E. MUHRBECK, OF HANCOCK, MINNESOTA, ASSIGNOR OF ONE-HALF TO GUST LUNDQUIST, OF NORTHWOOD, NORTH DAKOTA

QUACK-GRASS DESTROYER

Application filed July 30, 1927. Serial No. 209,616.

This invention relates to a digging and picking implement, and while the invention has utility for digging and picking various kinds of plants and the roots thereof from the ground, it especially is designed for digging, picking and destroying quack grass. It is now generally understood that if quack grass is cut off some distance beneath the soil and the roots dug up and separated from the soil so that they will be exposed to the sun the quack grass can be killed.

It is an object of this invention, therefore, to provide a simple and very efficient machine for cutting off the quack grass, digging and separating the roots thereof so that the same are separated from the soil and discharged to the rear of the machine.

It is a further object of the invention to provide a machine for digging and separating quack grass comprising a blade movable beneath the surface of the soil, and a plurality of pickers movable above said blade and in close proximity thereto in orbital paths disposed substantially in vertical planes.

It is a further object of the invention to provide a quack grass destroying machine comprising a frame, a blade carried by said frame and movable beneath the surface of the soil, a crank shaft disposed above said blade having a plurality of cranks, a plurality of arms extending longitudinally of the machine swingingly mounted at their rear ends and carried, respectively by said cranks, said arms having a plurality of downwardly extending teeth thereon and having rearwardly and downwardly curved teeth at their forward ends movable over said blade.

It is still another object of the invention to provide a quack grass destroying machine, such as defined in the preceding paragraph, together with means disposed below said arms and the teeth thereon for assisting in separating the grass and roots and moving the same rearwardly of the machine.

It is also a further object of the invention to provide a machine, as set forth in the two preceding paragraphs, said last mentioned means comprising bars having upwardly projecting pins between which said teeth move, together with endless conveyers moving between said bars and pins and having means thereon for separating the grass and roots therefrom.

Figure 1:
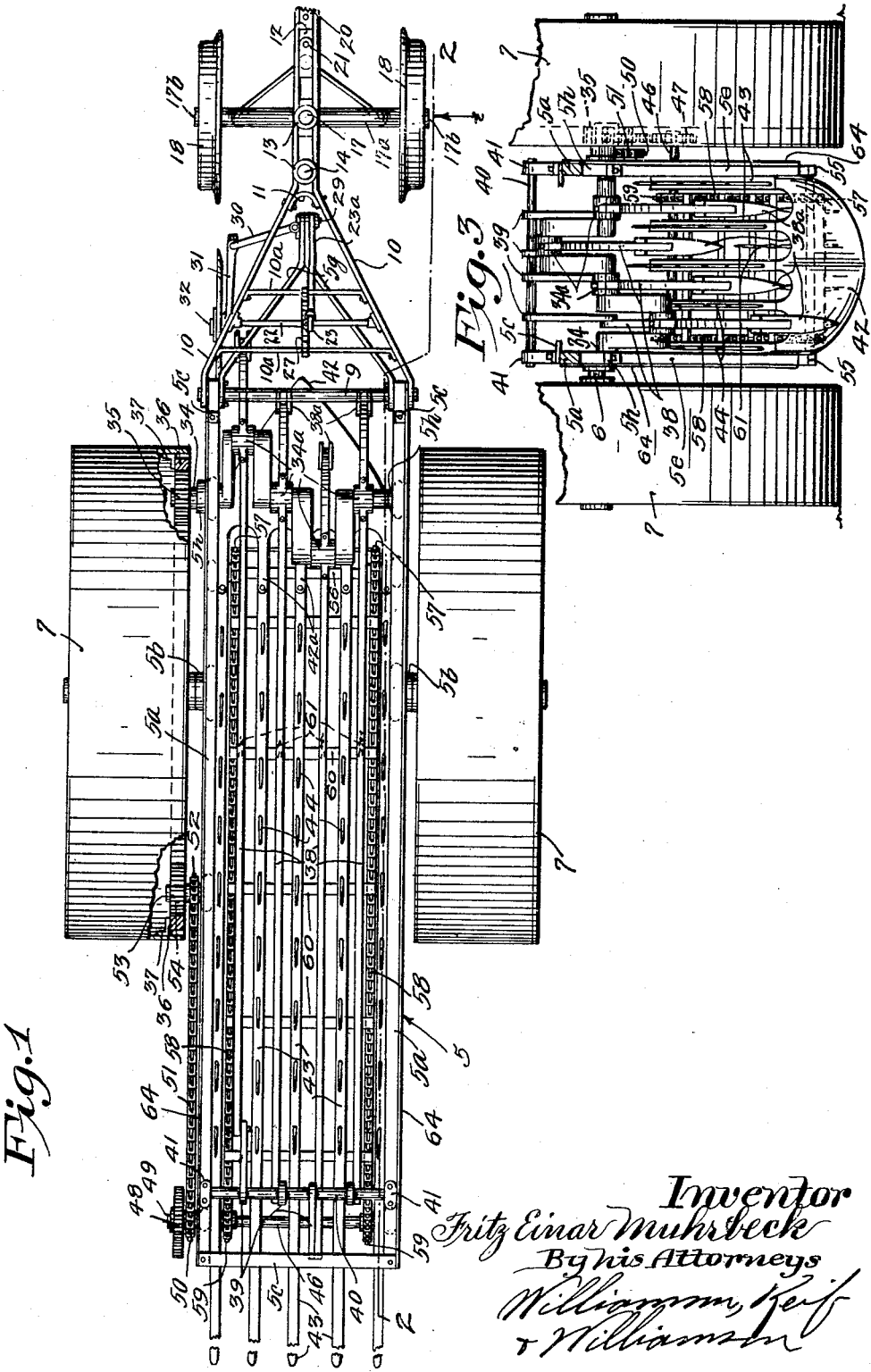
Figure 2:
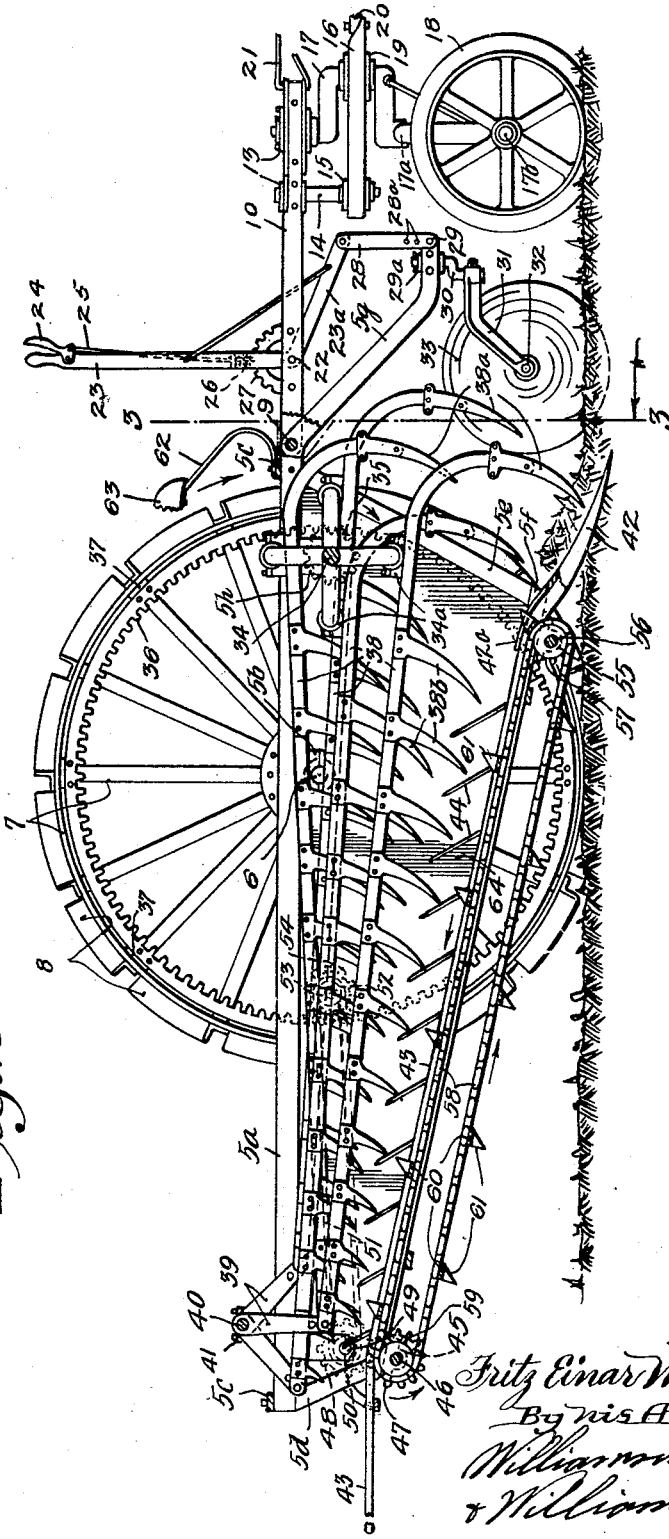

These and other objects and advantages of the invention will be fully set forth in the following description made in connection with the drawings in which like reference characters refer to the same parts throughout the different views, and in which, Fig. 1 is a top plan view of the machine, some parts being broken away and others shown in horizontal section;

Fig. 2 is a view in side elevation in vertical section taken on the line 2—2 of Fig. 1; and Fig. 3 is a view in vertical section taken on the line 3—3 of Fig. 2, the top portion of the wheels being broken away.

Referring to the drawings, a machine is shown comprising a frame 5 having longitudinally extending side members 5ª having axle receiving hubs 5ᵇ in which are carried the axles 6 received in the hubs of main driving wheels 7. As shown in Fig. 2, the driving wheels 7 may be provided on their peripheries with spaced helically extending cleats 8. While these cleats may be in any desired form, in the embodiment of the invention illustrated, they are shown in the form of angle bars. The frame members 5ª are connected at their front and rear ends by transverse members 5ᶜ extending across the tops thereof and secured to the horizontal flanges of the angle bars constituting members 5ª. The side members also have downwardly and rearwardly extending bars 5ᵈ at their rear ends and downwardly and forwardly extending bars 5ᵉ at their front ends, these bars being connected adjacent their lower ends by upwardly and rearwardly extending bars 5ᶠ, thus forming a quadrilateral frame structure. The bars 5ª have rigidly connected to their forward ends downwardly extending converging bars 5ᵍ which are connected together at their ends. A shaft 9 extends between and is secured in the members 5ª, said shaft having journaled on its ends forwardly extending converging bars 10 extending in parallel relation at their forward ends and connected in such spaced relation by members 11 and 12. The members 10 have bearings 13 secured therein and a vertical pivot shaft 14 extends through the rear one of said bearings and also extends through a bearing 15 below said bearing 13 which is carried in a horizontally and forwardly extending member 16 spaced below the members 10. The upper end of a crank member 17 is journaled in the forward bearing 13 and carries at its lower end directly beneath the forward bearing 13 a downwardly extending yoke member 17ª having outwardly projecting horizontal stub shafts 17ᵇ on which are carried the caster wheels 18. The crank portion of member 17 is journaled in the bearing 19 also carried in the member 16, to which member the tongue or pole 20 of the machine will be rigidly connected. A clevis or similar member 21 is pivotally connected to the forward ends of member 10 to which the traction means will be connected. The members 10 have brace members 10ª secured thereto and extending therebetween and the shaft 22 also extends between members 10 and is secured thereto. A lever 23 is pivoted on shaft 22 having a handle portion adjacent which is pivoted the pawl grip 24 connected by a link 25 to the pawl 26 adapted to seat in any one of the notches of a segment 27 secured to the members 10ª. The lever 23 below the shaft 22 has a downwardly and forwardly extending arm 23ª pivotally connected to a downwardly extending link 28 having a plurality of holes 28ª adjacent its lower end in any one of which a pivot pin 29 may be disposed to connect said link to the forward ends of members 5ᵉ. The forward ends of members 5ᵉ have a bearing 29ª secured therein in which is journaled a vertically disposed crank shaft 30 having secured to its lower end an arm 31 having a stud 32 in its lower end on which is journaled a coulter disk 33. The side members 5ª have bearings 5ᵇ secured thereto forwardly of the bearings 5ᵇ in which is journaled a crank shaft 34 having a plurality of crank portions 34ª thereon. Crank shaft 34 carries at one end a gear 35 which meshes with an internal gear 36 secured inside of the member of one wheel 7, said gear being secured to spaced angle lugs 37 secured to said wheel. Crank shaft 34 has journaled on the crank portions or pins 34ª thereof, arms or swinging bars 38. These arms 38 extend longitudinally of the frame 5 in an upwardly and rearwardly inclined direction and are pivotally connected at their rear ends to the ends of arms or links 39 journaled on a shaft 40 carried in bearings 41 projecting upwardly from and secured to the side members 5ª. The forward portions of arms 38 are curved downwardly and rearwardly substantially in the arc of a circle and have downwardly extending teeth or pickers 38ª secured thereto. The bars 38 also have a plurality of downwardly extending spaced teeth 38ᵇ secured thereto throughout their length, said teeth decreasing in length toward the rear ends of said arms. A blade or share 42 is secured to the forked ends of the bars 5ᶠ in the lower ends of the bars 5ᵉ and projecting forwardly and downwardly, said blade having a pointed end with forwardly converging sides, as shown in Figs. 1 and 3. A plurality of bars 43 extend longitudinally of the frame parallel to the bars 5ᶠ, said bars being secured to rearwardly projecting arms 42ª of the share 42 and secured at their rear ends, the bars being supported at the rear ends on a transverse member of the frame and projecting some distance in the rear of members 5ᶜ and 5ᵈ, as shown in Figs. 1 and 2. The bars 43 have projecting upwardly therefrom, pins 44 illustrated as inclined rearwardly. Bearings 45 are carried at each side of the frame at the lower ends of members 5ᵈ in which is journaled a shaft 46. The shaft 46 carries a gear 47 at one end at the outer side of the side members 5ª meshing with a gear 48 disposed thereabove, which latter is carried in a stub shaft 49 carried in the upwardly projecting extension of bearing 45. The stub shaft 49 has secured thereto a sprocket wheel 50 over which runs a chain 51, said chain running over a sprocket 52 at its forward end secured to a stub shaft 53 carried in a bearing secured to side members 5ª. The shaft 53 has a gear 54 secured thereto which also meshes with the internal gear 36 on wheel 7. Bearings 55 are also secured at the forward end of the frame adjacent the lower ends of members 5ᵉ in which is journaled a shaft 56. The shaft 56 has spaced sprockets 57 secured thereto over which run, respectively, the chains 58, said chains also running over sprockets 59 secured to shafts 46. The chains 58 have secured thereto, at intervals, bars 60 which extend between said chains, said bars carrying the members 61 illustrated as in the form of a comparatively thin metal plate or blade having upper rearwardly inclined edges. The chains 58 and bars 60 of course constitute an endless conveyor or carrier extending from the rear of the blade 42 to the rear of the oscillatory arms or bars 38. The chains 58 move in the direction shown by the arrows in Fig. 2. A bracket bar 62 is secured to a transverse bar 5ᶜ and reversely curved to have its upper end secured rearwardly and a seat 63 is carried by said bar. Plates 64 are secured at the sides of member 5ª and enclose frame 5.

In operation, the machine will be drawn forwardly by some suitable traction means, such as a team of horses, or a tractor. The lever 23 will be adjusted so as to position blade 42 at the height desired. It will be seen by swinging lever 23 that the frame will be raised or lowered, the members 5ª swinging about pivot shaft 9 about which the members 10 will also swing. When the blade 42 is properly adjusted and the machine drawn forwardly, said blade will move through the ground, as shown in Fig. 2, cutting off a certain layer of earth and severing the roots of the grass, or other plants being eradicated. As the wheels 7 move forwardly, gear 36 is revolved and pinion 35 rotated, thus rotating the crank shaft 34. As crank shaft 34 is rotated the arms or bars 38 are moved, or gyrated at their forward ends in orbital paths, the rear ends thereof swinging on their arms or links 39 which swing about shaft 40. The lower ends of the teeth or pickers 38ª move quite close to the top surface of the blade 42 and the grass and roots severed by said blade are dug or picked and separated from the soil. These grass and roots are given a movement toward the rear of the machine and will be pushed backwardly along the bars 43. The grass and roots will be successively engaged by the teeth 38ᵇ. The bars 43 and pins 44 are provided to keep the roots from sticking to the teeth 38ᵇ and, in a sense, to comb the same therefrom. The chains, with their moving bars 60 are provided with the blade members 61 to insure that the grass will not accumulate or become piled up on the pins 44. The blade members 61 move between the pins and will sever and release the grass or roots which might accumulate against said pins. The grass and roots are thus kept moving rearwardly of the machine and will be discharged at the ends thereof and from the bars 43. As the machine moves forwardly the coulter disk 33 will cut into the soil to define one side of the piece of land being treated. The machine can be guided effectively by the tongue member 20 and the caster wheels 18 will swing with the tongue. When it is desired to transport the machine while the same is in operation, the lever 23 can be swung to raise the blade 42, above the surface of the ground. The machine can then be drawn over the ground merely moving on the wheels 7 and 18. The plates 64 retain the grass and roots until discharged at the rear end of the machine.

From the above description it is seen that applicant has provided a very simple and efficient machine for destroying quack grass, objectionable weeds or other plants. The grass and weeds, together with their roots, are dug up and efficiently separated from the soil so that they can be exposed to the sun and are quickly withered. The machine is comparatively simple in structure and can be made very strong and rugged.

It will, of course, be understood, that various changes may be made in the form, details, arrangement, and proportions of the parts without departing from the scope of applicant's invention, which, generally stated, consists in a device capable of carrying out the objects above set forth and described and defined in the appended claims.

What is claimed is:

1. A quack grass destroying machine having in combination, a frame, a blade carried thereby adapted to move through the ground and sever the grass and roots, a crank shaft journaled in said frame above said blade having a plurality of cranks thereon, a plurality of arms respectively carried on said cranks extending longitudinally of the frame and swingingly mounted on depending links at the rear end thereof, said arms each having a rearwardly curved downwardly extending tooth at its forward end moving over and in close proximity to said blade, said arms having downwardly extending teeth spaced throughout their length thereof, spaced bars extending longitudinally of said frame below said teeth having pins projecting upwardly thereof, and an endless carrier moving between said bars and having spaced members projecting upwardly therefrom movable between said bars and adjacent said pins for removing any accumulation of grass and roots.

2. A quack grass digging machine having in combination, a frame, a blade carried thereby and adapted to move beneath the surface of the ground, a crank shaft extending transversely of said frame and carried therein having a plurality of crank arms, a plurality of arms respectively carried by said crank arms, said arms being pivoted at their rear ends to links, respectively, journaled on a shaft extending transversely of said frame, each arm having a plurality of downwardly projecting spaced teeth and having a rearwardly curved downwardly extending picker at its forward end movable over and in close proximity to said blade, and means co-operating with said arms and teeth for separating grass and roots and moving the same rearwardly of said frame.

3. The structure set forth in claim 2, said teeth on said arms decreasing in length rearwardly of said machine.

4. A quack grass destroying machine having in combination, a frame, means carried thereby for moving through the ground and severing the grass and roots, and a plurality of means gyrating in vertical planes above said first mentioned means for separating the grass and roots from the soil, said last mentioned means extending longitudinally of the frame and having spaced members thereon for engaging the grass and roots, and means co-operating with said members for moving said grass and roots longitudinally of the frame and cutting the same.

5. A quack grass destroying machine having in combination, a frame, means carried thereby for moving through the ground for severing the grass and roots, a plurality of bars extending longitudinally of said frame mounted for swinging movement at their rear ends, cranks connected to the forward ends of said bars for moving them in circular paths, a plurality of stationary bars extending longitudinally of the frame beneath and between said bars, downwardly and rearwardly curved teeth at the ends of said first mentioned bars and spaced rearwardly directed teeth depending from the same throughout their length, and an endless conveyor beneath said second mentioned bars having cutting members projecting above the same.

6. A quack grass destroying machine having in combination, a frame, a blade carried thereby adapted to move through the ground and sever the grass and roots, a plurality of bars disposed in said frame mounted for oscillating movement at their rear ends and for circular movement at their forward ends, rigid teeth depending from said bars at their forward ends and movable rearwardly over said blade and adjacent thereto, spaced teeth depending throughout the length of said bars, and spaced stationary bars beneath said first mentioned bars having pins projecting upwardly therefrom with which said last mentioned teeth co-operate, said first mentioned teeth acting to tear the roots from the soil and said last mentioned teeth operating to move said roots to the rear of the machine.

7. A quack grass destroying machine having in combination, a frame, a blade carried thereby adapted to move through the ground and sever the grass and roots, a crank shaft journaled in said frame above said blade having a plurality of cranks thereon, a plurality of arms respectively carried on said cranks extending longitudinally of the frame and swingingly mounted at the rear end thereof, said arms each having a rearwardly curved rigid downwardly extending tooth at its forward end moving over and in close proximity to said blade to tear and separate said grass and roots from the soil, said arms having a plurality of downwardly extending teeth secured thereto throughout their length, bars extending longitudinally of said frame between said arms having pins projecting upwardly toward said arms and an endless conveyor movable beneath said last mentioned bars.

8. A quack grass destroying machine having in combination, a frame, a blade carried thereby adapted to move through the ground and sever the grass and roots, a crank shaft journaled in said frame above said blade having a plurality of cranks thereon, a plurality of arms respectively carried on said cranks extending longitudinally of the frame and swingingly mounted at the rear end thereof, said arms each having a rearwardly curved rigid downwardly extending tooth at its forward end moving over and in close proximity to said blade to tear and separate said grass and roots from the soil, bars extending longitudinally between said arms having pins projecting upwardly therefrom, a plurality of teeth projecting downwardly from each of said arms in spaced relation between said pins, and means moving between said bars for removing any grass and roots which might accumulate against said pins.

9. A quack grass destroying machine having in combination a frame, means carried thereby for moving through the ground for severing the grass and roots, a plurality of bars extending longitudinally of said frame mounted for swinging movement at their rear ends, cranks connected to the forward ends of said bars for moving them in circular paths, a plurality of stationary bars extending longitudinally of the frame beneath and between said bars, downwardly and rearwardly curved teeth at the ends of said first mentioned bars and spaced rearwardly directed teeth depending from the same throughout their length, and an endless conveyor beneath said second mentioned bars having cutting members projecting above the same, said last mentioned bars having spaced pins projecting upwardly therefrom and inclined rearwardly, between which said last mentioned teeth move.

10. A quack grass destroying machine having in combination, a frame, a blade carried thereby adapted to move through the ground and sever the grass and roots, a plurality of bars disposed in said frame mounted for oscillating movement at their rear ends and for circular movement at their forward ends, rigid teeth depending from said bars at their forward ends and movable rearwardly over said blade and adjacent thereto, spaced teeth depending throughout the length of said bars, and spaced stationary bars beneath said first mentioned bars having pins projecting upwardly therefrom with which said last mentioned teeth cooperate, said first mentioned teeth acting to tear the roots from the soil and said last mentioned teeth operating to move said roots to the rear of the machine, and an endless conveyor movable beneath said last mentioned bars and having blades thereon extending above said last mentioned bars to sever any roots collecting on said pins.

In testimony whereof I affix my signature.

FRITZ E. MUHRBECK.